(12) United States Patent
Park et al.

(10) Patent No.: US 11,032,408 B2
(45) Date of Patent: Jun. 8, 2021

(54) METHOD AND SYSTEM FOR AUTOMATICALLY CONNECTING CALLS OF VOICE OVER INTERNET PROTOCOL (VOIP) SERVICE

(71) Applicant: LINE Corporation, Tokyo (JP)

(72) Inventors: Jungjun Park, Seongnam-si (KR); Dongwon Lee, Seongnam-si (KR); Jongjin Cho, Seongnam-si (KR); In Won Cho, Seongnam-si (KR)

(73) Assignee: LINE Corporation, Tokyo (JP)

( * ) Notice: Subject to any disclaimer, the term of this patent is extended or adjusted under 35 U.S.C. 154(b) by 157 days.

(21) Appl. No.: 16/107,149

(22) Filed: Aug. 21, 2018

(65) Prior Publication Data

US 2019/0068769 A1    Feb. 28, 2019

(30) Foreign Application Priority Data

Aug. 22, 2017    (KR) .................. 10-2017-0105947

(51) Int. Cl.
| | | |
|---|---|---|
| *H04M 1/253* | (2006.01) | |
| *H04M 3/432* | (2006.01) | |
| *H04L 29/06* | (2006.01) | |
| *H04M 3/44* | (2006.01) | |
| *H04M 3/50* | (2006.01) | |

(Continued)

(52) U.S. Cl.
CPC ...... *H04M 1/2535* (2013.01); *H04L 65/1059* (2013.01); *H04L 65/1069* (2013.01);
(Continued)

(58) Field of Classification Search
CPC ...... H04M 1/2535; H04M 3/44; H04M 3/432; H04M 3/50; H04M 1/27475;
(Continued)

(56) References Cited

U.S. PATENT DOCUMENTS 8,054,754 B1 * 11/2011 Xue .................. H04L 69/40
370/248
10,129,412 B1 * 11/2018 Singh .................. H04L 25/20
(Continued)

FOREIGN PATENT DOCUMENTS

KR    10-2006-0042808 A    5/2006
KR    10-2006-0078159 A    7/2006
(Continued)

OTHER PUBLICATIONS

Rosenberg et al., SIP: Session Initiation Protocol, Network Working Group, Jun. 2002, RFC 3261. (Year: 2002).*
(Continued)

*Primary Examiner* — Shailendra Kumar
(74) *Attorney, Agent, or Firm* — Harness, Dickey & Pierce, P.L.C.

(57) ABSTRACT

Provided is a method and system for automatically connecting a call of a Voice over Internet Protocol (VoIP) service. A method of automatically connecting the VoIP call in an electronic device implemented by a computer may include a setting a specific counterpart among counterparts capable of making the VoIP call over a network as an automatic connection target; and automatically connecting a call with the specific counterpart immediately in response to executing a program including a function of providing the VoIP call without performing a calling operation and an acceptance operation for a call between a user of the electronic device and the specific counterpart.

18 Claims, 9 Drawing Sheets

(51) Int. Cl.
*H04M 1/27475* (2020.01)
*H04M 3/436* (2006.01)

(52) U.S. Cl.
CPC ........ *H04L 65/1096* (2013.01); *H04M 3/432* (2013.01); *H04M 3/44* (2013.01); *H04M 3/50* (2013.01); *H04M 1/27475* (2020.01); *H04M 3/436* (2013.01); *H04M 2203/652* (2013.01); *H04M 2203/655* (2013.01)

(58) Field of Classification Search
CPC ..... H04M 2203/652; H04M 2203/655; H04M 3/436; H04M 7/006; H04M 1/72583; H04M 1/72522; H04L 65/1059; H04L 65/1069; H04L 65/1096
See application file for complete search history.

(56) References Cited

U.S. PATENT DOCUMENTS

| | | | | |
|---|---|---|---|---|
| 2007/0097994 | A1* | 5/2007 | Samdadiya | H04L 29/06027 370/401 |
| 2014/0328479 | A1* | 11/2014 | Epiktetov | H04L 61/605 379/265.09 |
| 2015/0078539 | A1* | 3/2015 | Jain | H04M 15/09 379/88.01 |
| 2015/0256570 | A1* | 9/2015 | Joon | H04L 12/1813 370/261 |
| 2016/0150089 | A1* | 5/2016 | Garg | H04M 7/006 370/352 |
| 2017/0134567 | A1* | 5/2017 | Jeon | H04M 1/72569 |
| 2020/0028955 | A1* | 1/2020 | Aihara | H04M 9/082 |

FOREIGN PATENT DOCUMENTS

| | | |
|---|---|---|
| KR | 10-1058930 B1 | 8/2011 |
| KR | 10-1629009 B1 | 6/2016 |
| KR | 101629009 B1 * | 6/2016 |

OTHER PUBLICATIONS

Korean Office Action dated Sep. 12, 2018 issued in corresponding Korean Application No. 10-2017-0105947 (no English translation).

* cited by examiner

METHOD AND SYSTEM FOR AUTOMATICALLY CONNECTING CALLS OF VOICE OVER INTERNET PROTOCOL (VOIP) SERVICE

CROSS-REFERENCE TO RELATED APPLICATION(S)

This U.S. non-provisional application claims the benefit of priority under 35 U.S.C. § 119 to Korean Patent Application No. 10-2017-0105947 filed on Aug. 22, 2017, in the Korean Intellectual Property Office (KIPO), the entire contents of which are incorporated herein by reference.

BACKGROUND

Field

One or more example embodiments relate to technology for providing a Voice over Internet Protocol (VoIP) service.

Description of Related Art

A portable Internet system provides a Voice over Internet Protocol (VoIP) service that enables calls by transferring audio/video data as an Internet protocol (IP) data packet among multimedia services.

The VoIP service requires a calling and acceptance process in response to a direct manipulation between users performed for making a call. A push-to-talk (PTT) service also requires a direction operation, for example, an operation of manipulating a push button, to transfer audio such as voice.

SUMMARY

One or more example embodiments provide a method and system that may automatically connect a call without performing a separate operation for a call between designated users.

One or more example embodiments also provide a method and system that may maintain a call connection during an execution of a program that includes a function of providing a Voice over Internet Protocol (VoIP) service between designated users.

According to an aspect of at least one example embodiment, there is provided a method of automatically connecting a call in an electronic device implemented by a computer, the method comprising setting a specific counterpart among counterparts capable of making a VoIP call over a network as an automatic connection target; and automatically connecting a call with the specific counterpart immediately in response to executing a program including a function of providing the VoIP call without performing a calling operation and an acceptance operation for a call between a user of the electronic device and the specific counterpart.

The setting may comprise setting the specific counterpart selected by the user from among the counterparts capable of making the VoIP call as the automatic connection target.

The setting may comprise setting the automatic connection target based on a call history accumulated for each of the counterparts.

The setting may comprise recommending at least one counterpart among the counterparts capable of making the VoIP call based on a call history accumulated for each of the counterparts; and setting the specific counterpart selected by the user from among the recommended counterparts as the automatic connection target.

The connecting may comprise immediately connecting a call between the user and the specific counterpart in response to executing the program on an electronic device of the specific counterpart and setting the user and the specific counterpart as mutual automatic connection targets.

The automatic call connection method may further include providing state information associated with the automatic connection target through a screen displayed on the electronic device.

The providing may comprise displaying information associated with the automatic connection target using a separate display element on a user interface screen of the program.

The providing may comprise displaying a call connection state with the automatic connection target on a user interface screen of the program.

The providing may comprise displaying an icon indicating a call connection state with the automatic connection target in a floating state on a screen displayed on the electronic device.

The icon indicating the call connection state with the automatic connection target may include a shortcut function of redirecting to a call screen or a call screen with the automatic connection target.

According to an aspect of at least one example embodiment, there is provided a non-transitory computer-readable recording medium storing instructions that, when executed by a processor, cause the processor to implement a method of automatically connecting a call in conjunction with a computer implemented by a computer, the method comprising setting a specific counterpart among counterparts capable of making a VoIP call over a network as an automatic connection target; and automatically connecting a call with the specific counterpart immediately in response to executing a program including a function of providing the VoIP call without performing a calling operation and an acceptance operation for a call between a user of the electronic device and the specific counterpart.

According to an aspect of at least one example embodiment, there is provided a system for automatically connecting a call in an electronic device implemented by a computer, the system comprising one or more processors configured to execute computer-readable instructions. The one or more processors comprise a target setter configured to set a specific counterpart among counterparts capable of making a VoIP call over a network as an automatic connection target; and a call connector configured to automatically connect a call with the specific counterpart immediately in response to executing a program including a function of providing the VoIP call without performing a calling operation and an acceptance operation for a call between a user of the electronic device and the specific counterpart.

According to some example embodiments, since audio, such as voice, or video may be exchanged at any time without performing a separate calling or acceptance operation by automatically connecting and maintaining a call during an execution of a program that includes a function of providing a VoIP service between designated users, it is possible to provide a convenient and continuous conversation environment between users that are calling for a relatively long period of time or frequently.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

Example embodiments relate to technology for providing a Voice over Internet Protocol (VoIP) service, and more particularly, to a method and system that may automatically connect a call without performing a separate operation for a call.

The example embodiments disclosed herein may automatically connect a call between users without performing a separate operation for a call in a VoIP service and accordingly, may achieve many advantages in terms of convenience, efficiency, cost reduction, and/or the like.

The term "call" used herein may inclusively indicate a voice call exchanged with a counterpart using audio such as voice and a video call exchanged with the counterpart using video and audio such as voice. For example, the call may represent a VoIP call of technology that converts the audio and/or the video to a digital packet and transmits the digital packet over a network using an IP address.

Figure 1:
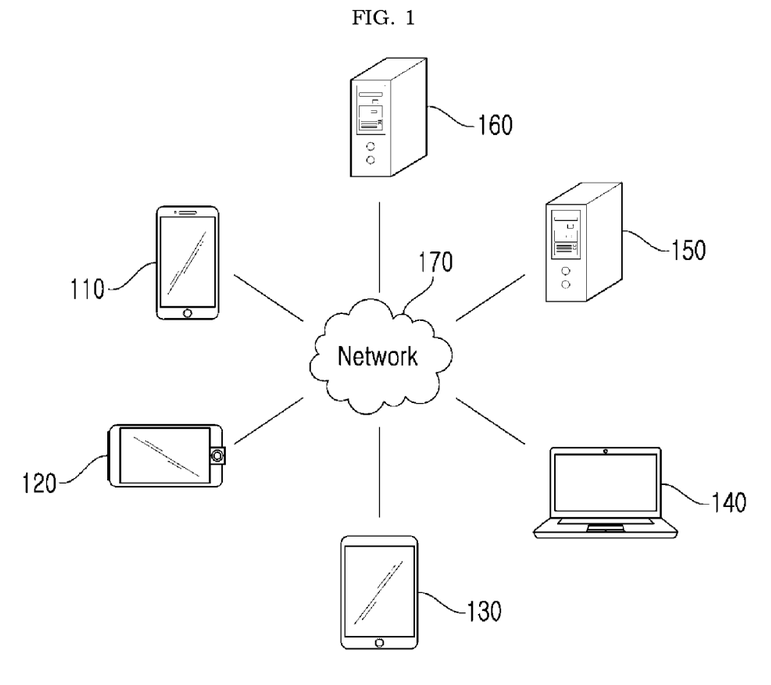
FIG. 1 is a diagram illustrating an example of a network environment according to at least one example embodiment.

FIG. 1 is a diagram illustrating an example of a network environment according to at least one example embodiment. Referring to FIG. 1, the network environment includes a plurality of electronic devices 110, 120, 130, and/or 140, a plurality of servers 150 and 160, and a network 170. FIG. 1 is provided as an example only and thus, a number of electronic devices and/or a number of servers are not limited thereto.

Each of the plurality of electronic devices 110, 120, 130, and/or 140 may be a fixed terminal or a mobile terminal configured as a computer device. For example, the plurality of electronic devices 110, 120, 130, and/or 140 may be a smartphone, a mobile phone, a tablet personal computer (PC), a navigation, a computer, a laptop computer, a digital broadcasting terminal, a personal digital assistant (PDA), a portable multimedia player (PMP), a tablet personal computer (PC), and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170. For example, the server 160 may provide a file for installing an application to the electronic device 110 connected over the network 170. In some example embodiments, the electronic device 110 may install the application using the file provided from the server 160. Also, the electronic device 110 may connect to the server 150 under control of at least one program, for example, browser or the installed application, or an operating system (OS) included in the electronic device 110. For example, when the electronic device 110 transmits a service request message to the server 150 through the network 170 under control of the application, the server 150 may transmit a code corresponding to the service request message to the electronic device 110 and the electronic device 110 may provide content to the user by configuring and displaying a screen corresponding to the code under control of the application.

Figure 2:
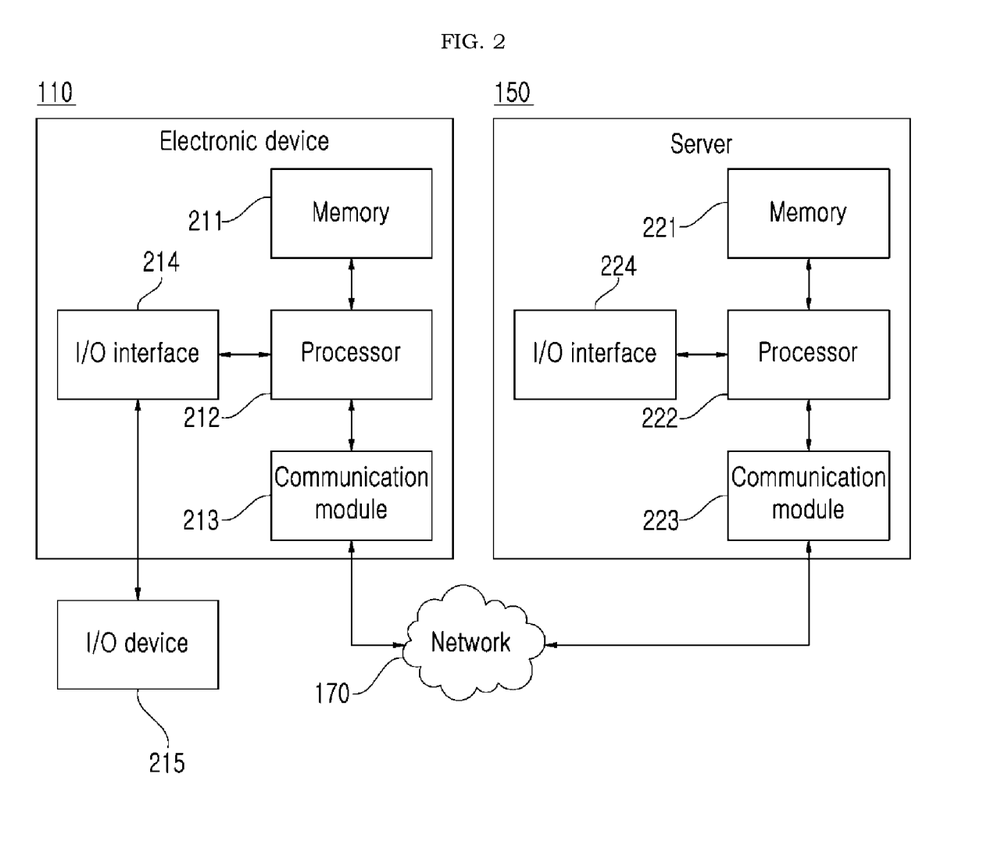
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, a flash memory, etc., as a non-transitory computer-readable storage medium. Also, an OS or at least one program code, for example, a code for an application installed and executed on the electronic device 110, may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the processor 212 of the electronic device 110 may transfer a request, for example, a search request, created based on a program code stored in the storage device such as the memory 211, to the server 150 over the network 170 under control of the communication module 213. Conversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium further includable in the electronic device 110.

The I/O interface 214 may be a device used for interface with an I/O device 215. For example, an input device may include a keyboard, a mouse, a microphone, a camera, etc., and an output device may include a device, such as a display for displaying a communication session of the application. As another example, the I/O interface 214 may be a device for interface with an apparatus in which an input function and an output function are integrated into a single function, such as a touchscreen. In detail, when processing instructions of the computer program loaded to the memory 211, the processor 212 of the electronic device 110 may display a service screen configured using data provided from the server 150 or the electronic device 120, or may display content on a display through the I/O interface 214. Likewise, when processing instructions of the computer program loaded to the memory 221, the processor 222 of the server 150 may display information configured using data provided from the server 150 through the I/O interface 224.

According to other example embodiments, the electronic device 110 and the server 150 may include a greater or lesser number of components than a number of components shown in FIG. 2. However, there is no need to specifically illustrate many components according to the related art. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera, various physical buttons, a button using a touch panel, an I/O port, a vibrator for vibration, etc., which are generally included in the smartphone. However, there is no need to specifically illustrate many components according to the related art.

Figure 3:
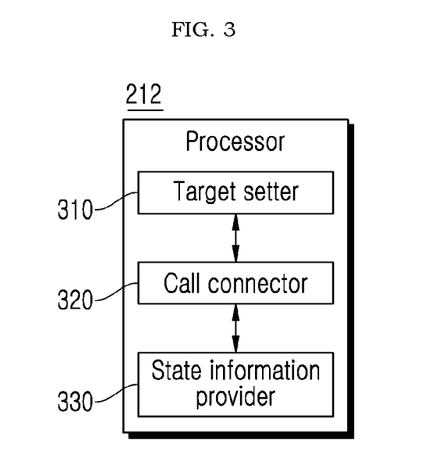
FIG. 3 is a diagram illustrating an example of components includable in a processor of an electronic device according to at least one example embodiment.
Figure 4:
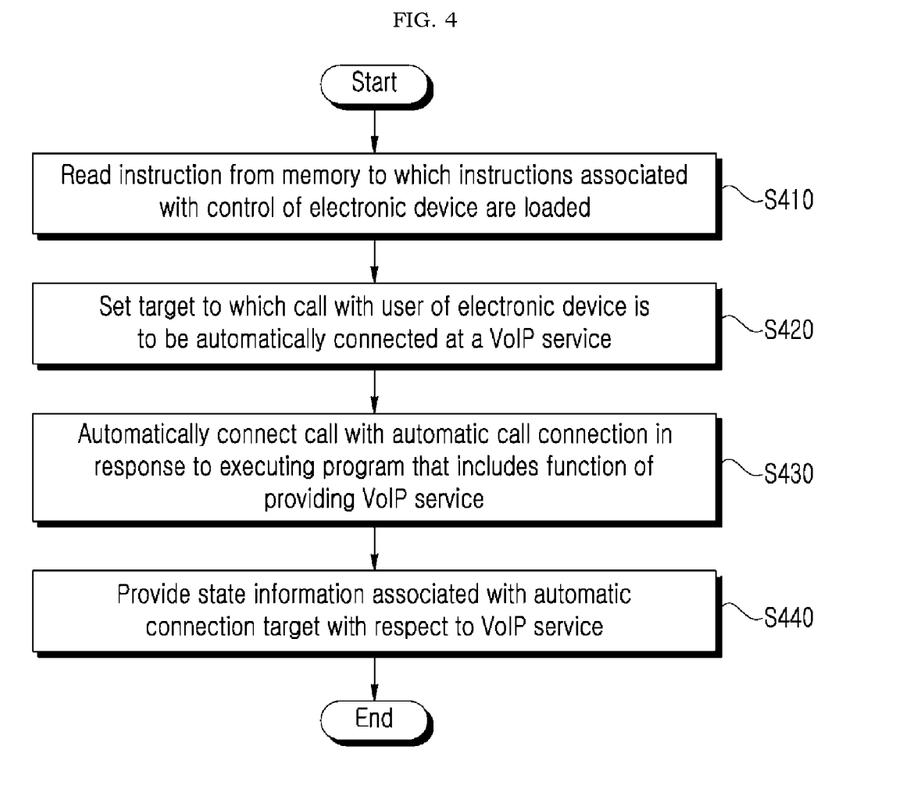
FIG. 4 is a flowchart illustrating an example of a method performed by an electronic device according to at least one example embodiment.

FIG. 3 is a block diagram illustrating an example of components includable in a processor of an electronic device according to at least one example embodiment, and FIG. 4 is a flowchart illustrating an example of a method performed by an electronic device according to at least one example embodiment.

An automatic call connection system configured as a computer may be provided in the electronic device 110 according to an example embodiment. The automatic call connection system may be configured as an application exclusive for a mobile terminal or a PC-based program to provide a VoIP service in a network environment through interaction with the server 150. Here, the automatic call connection system may be configured in a form of an independently operating program or may be configured in an in-app form of a specific application, for example, a messenger, to be operable on the specific application.

For example, the automatic call connection system configured in the electronic device 110 may perform the automatic call connection method in response to an instruction provided from the application installed on the electronic device 110. Referring to FIG. 3, to perform the automatic call connection method of FIG. 4, the processor 212 of the electronic device 110 may include a target setter 310, a call connector 320, and a state information provider 330.

Depending on embodiments, components of the processor 212 may be selectively included in or excluded from the processor 212. Also, the components of the processor 212 may be separate or merged for representation of a function of the processor 212.

The processor 212 and the components of the processor 212 may control the electronic device 110 to perform operations S410 through S440 included in the automatic call connection method of FIG. 4. For example, the processor 212 and the components of the processor 212 may be configured to execute an instruction according to a code of at least one program and a code of an OS included in the memory 211.

Here, the components of the processor 212 may be representations of the processor 212 performed by the processor 212 in response to an instruction provided from a program code stored in the electronic device 110, for example, an instruction provided from the application executed on the electronic device 110. For example, the target setter 310 may be used as a functional representation of the processor 212 that controls the electronic device 110 to set a call target to be automatically connected in response to the instruction.

Referring to FIG. 4, in operation S410, the processor 212 may read an instruction from the memory 211 to which instructions associated with control of the electronic device 110 are loaded. In some example embodiments, the read instruction may include an instruction for controlling the processor 212 to perform the following operations S420 through S440.

In operation S420, the target setter 310 may set a target (hereinafter, also referred to as an "automatic connection target") to which a call with the user of the electronic device 110 is to be automatically connected at a VoIP service. The target setter 310 may set the automatic connection target among counterparts with which a VoIP call is available over the network, for example, counterparts registered to a contact list and/or a friend list of the user of the electronic device 110. Here, the target setter 310 may set the corresponding target by storing information, for example, a phone number and an ID, identifiable on the VoIP service with respect to the automatic connection target. For example, the target setter 310 may set a counterpart directly selected by the user of the electronic device 110 as the automatic connection target. As another example, the target setter 310 may set the automatic connection target based on a call history accumulated for each counterpart based on a predetermined (or, alternatively, desired) time unit, for example, every 1 week and 1 month. For example, the target setter 310 may set, as the automatic connection target, a counterpart that makes a call most frequently or for a relatively long period of time with the user of the electronic device 110 based on a number of calls made with the user or an amount of time used for call for each counterpart. Here, the target setter 310 may update the automatic connection target every time unit. As another example, the target setter 310 may set the automatic call connection based on a selection by the user of the electronic device 110. Here, the target setter 310 may recommend one or more counterparts to the user based on a call history accumulated for each counterpart and may set, as the automatic connection target, a counterpart selected by the user from among the recommended counterparts. A process of setting the automatic connection target may include a procedure of verifying an opinion (acceptance or refusal) of a counterpart. If the counterpart accepts or if a bidirectional setting is completed between the user and the counterpart, the target setter 310 may allow settings as the automatic connection target.

In operation S430, the call connector 320 may automatically connect a call with the automatic connection target set in operation S420 in response to executing a program, for example, a messenger application, including a function of providing a VoIP service and receiving an instruction from the executed program. Here, the call connector 320 may attempt a call connection to an electronic device, for example, the electronic device 120, of the automatic connection target at the same time at which the program is executed on the first electronic device 110. Here, if the corresponding program is being executed on the electronic device of the automatic connection target like the electronic device 110, the call connector 320 may connect a VoIP call between the user of the electronic device 110 and the automatic connection target. That is, the call connector 320 may not require an operation of the user for making the VoIP call or an operation of the automatic connection target for accepting a call connection of the user and may automatically connect the VoIP call between the user and the automatic connection target immediately once the program is executed. If the user attempting the call connection is also an automatic connection target set at the electronic device of the automatic connection target, the electronic device of the automatic connection target may automatically connect the corresponding call without requesting a separate acceptance process. That is, if two users are set as the mutual automatic connection targets, a call between the two users may be automatically connected. The call connector 320 may maintain a call state between the user and the automatic connection target while the corresponding program is being executed on the electronic device 110 of the user and the electronic device of the automatic connection target, unless the user or the counterpart forcefully ends the call.

In operation S440, the state information provider 330 may provide state information associated with the automatic connection target with respect to the VoIP service. For example, the state information provider 330 may display information about the automatic connection target on a user interface screen of the program that includes the function of providing the VoIP service. For example, when displaying a friend list on a screen during the execution of the program, the state information provider 330 may apply a separate display factor, for example, a highlight, to a friend item set as the automatic connection target using an indicator indicating the automatic connection target so that the corresponding friend item may be distinguished from other items. As another example, the state information provider 330 may display a call connection state with the automatic connection target on the user interface screen of the program that includes the function of providing the VoIP service. For example, when displaying the friend list during the execution of the program, the state information provider 330 may display the call connection state (connected or waiting) on the friend item set as the automatic connection target. As another example, the state information provider 330 may overlay and thereby display an icon representing the call connection state with the automatic connection target on all of the screens displayed on a display of the electronic device 110. Here, the icon representing the call connection state may be configured as a user interface displayed in a floating state at all times on the screen of the electronic device 110, such as floating ChatHeads, and may include a shortcut function of redirecting to a call screen or a chat screen with the automatic connection target in response to selecting the icon.

Hereinafter, an example of a messenger including a VoIP function, for example, a voice call and/or a video call, will be described.

Figure 5:
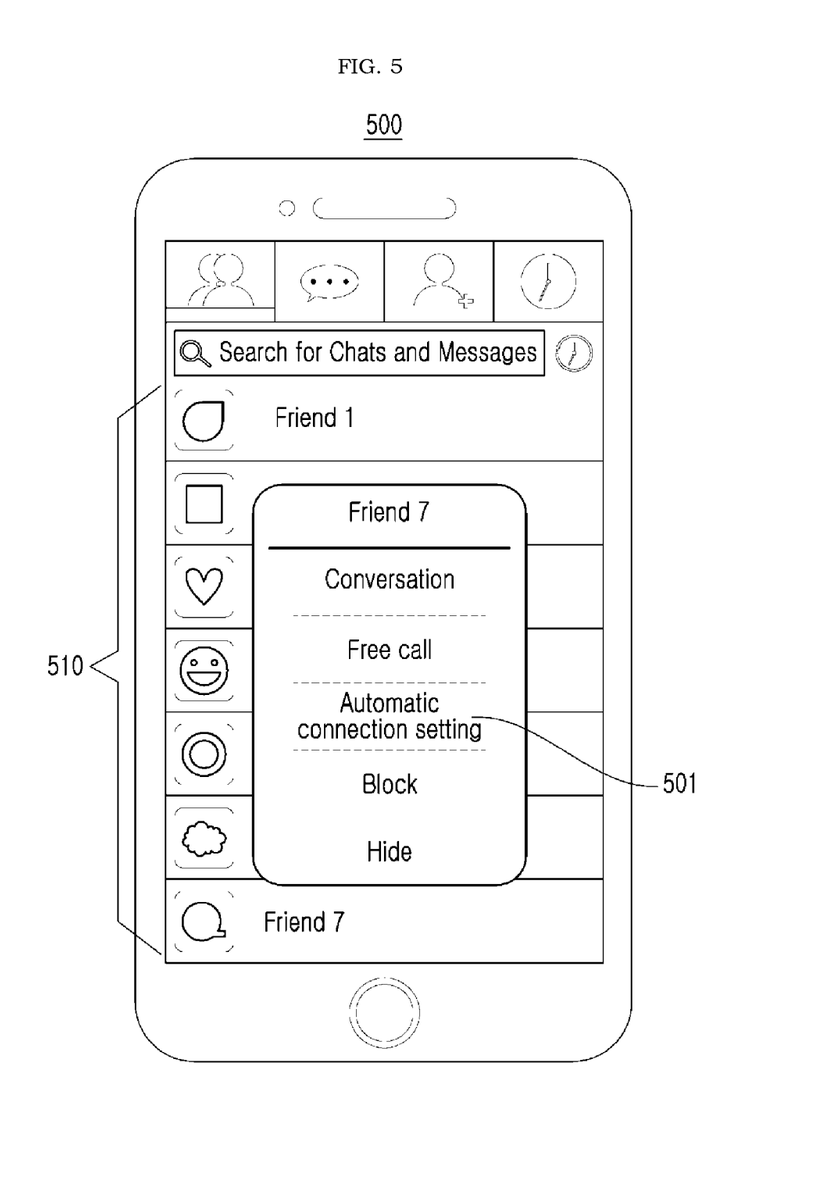
FIG. 5 illustrates an example of a process of setting an automatic connection target according to at least one example embodiment.

FIG. 5 illustrates an example of a process of setting an automatic connection target according to at least one example embodiment.

FIG. 5 illustrates a friend interface screen 500 as one of user interface screens of a messenger installed on the electronic device 110. Here, the friend interface screen 500 may include a list of friends 510 registered on the messenger.

The target setter 310 may provide a function of setting a friend directly selected by the user as an automatic connection target. For example, referring to FIG. 5, if the user selects a specific friend on the list of friends 510 displayed on the friend interface screen 500, the target setter 310 may provide an "automatic connection setting" menu 501 for setting the automatic connection target. If the user inputs the "automatic connection setting" menu 501 in a state in which the specific friend is selected from the list of friends 510, the target setter 310 may set the selected friend as the automatic connection target.

Accordingly, without requesting a separate operation, it is possible to designate in advance the automatic connection target in response to a selection of the user at the same time at which the program is executed. It is provided as an example only. Thus, the automatic connection target may be set based on a call history of the user.

Figure 6:
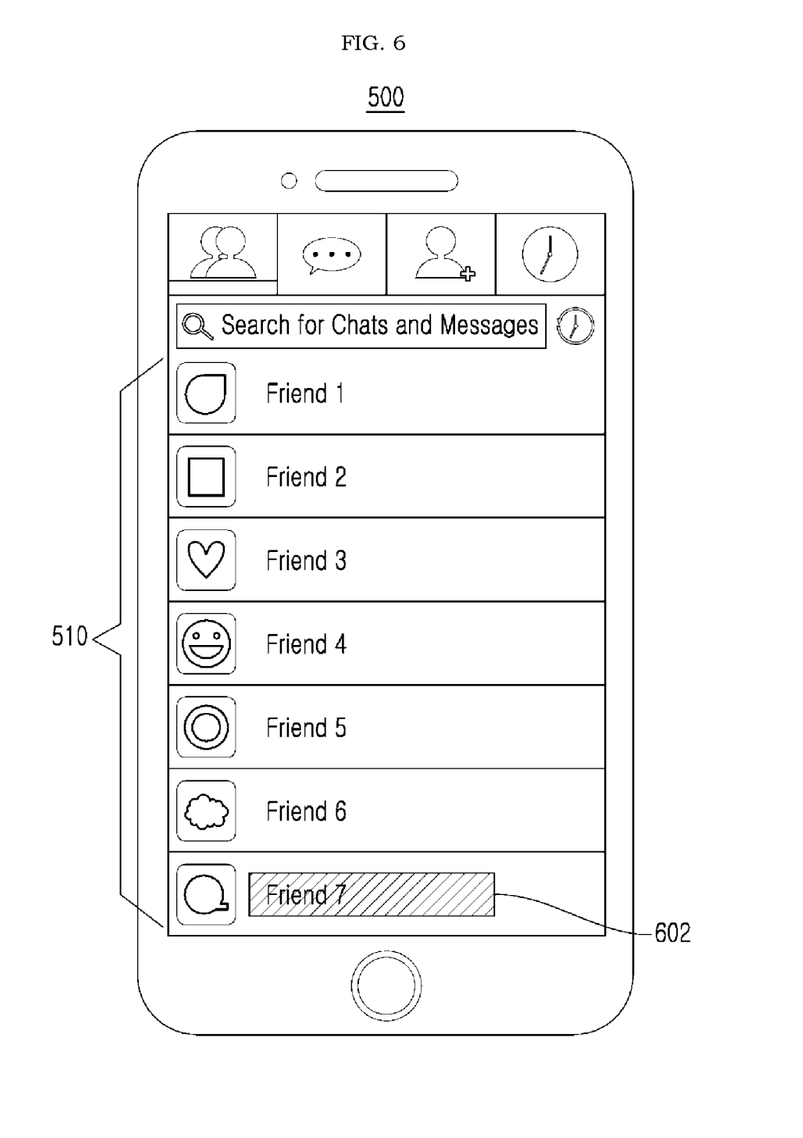
FIGS. 6 and 7 illustrate examples of a process of displaying an automatic connection target according to at least one example embodiment.
Figure 7:
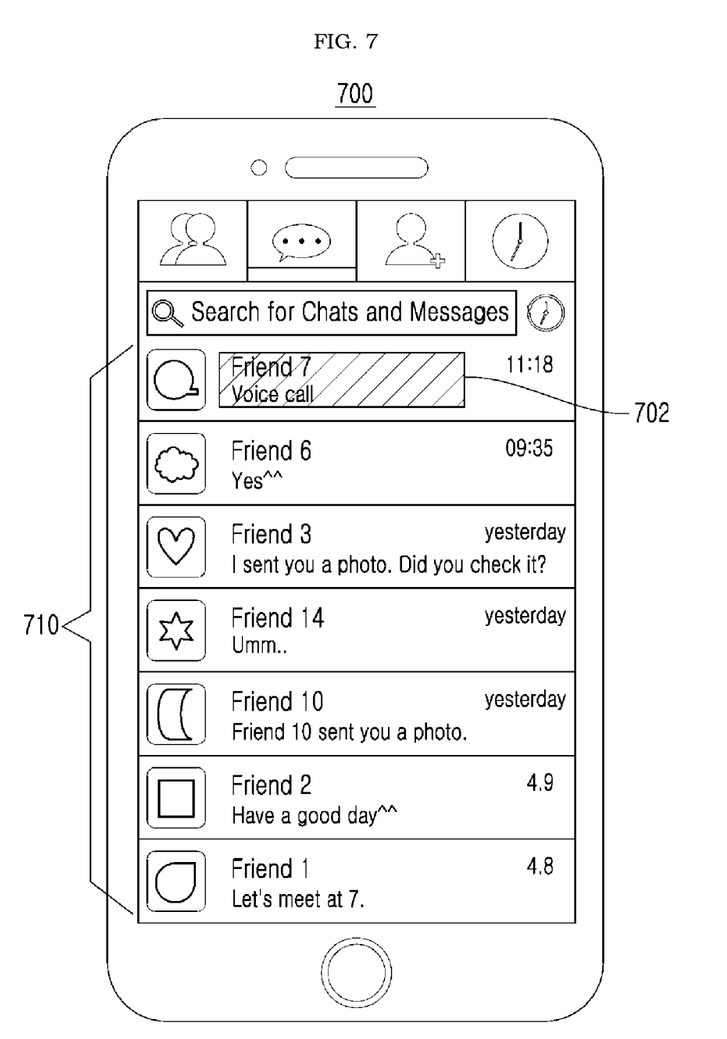

FIGS. 6 and 7 illustrate examples of a process of displaying an automatic connection target according to at least one example embodiment.

The state information provider 330 may display information about the automatic connection target on a user interface screen of a messenger. For example, referring to FIG. 6, the state information provider 330 may display a separate display element, for example, a highlight 602 on a friend item set as the automatic connection target on the friend interface screen 500 including the list of friends 510 registered on the messenger.

As another example, referring to FIG. 7, the state information provider 330 may also display information about the automatic connection target on a conversation interface screen 700 including a list of friends 710 each having a call history with the user. That is, the state information provider 330 may display a separate display element 702 on the friend item set as the automatic connection target from the list of friends 710 displayed on the conversation interface screen 700.

In addition to the friend interface screen 500 or the conversation interface screen 700, information about the automatic connection target may be displayed on any type of interface screens including friend information, such as a conversation screen, a call screen, and an environment setting screen.

Figure 8:
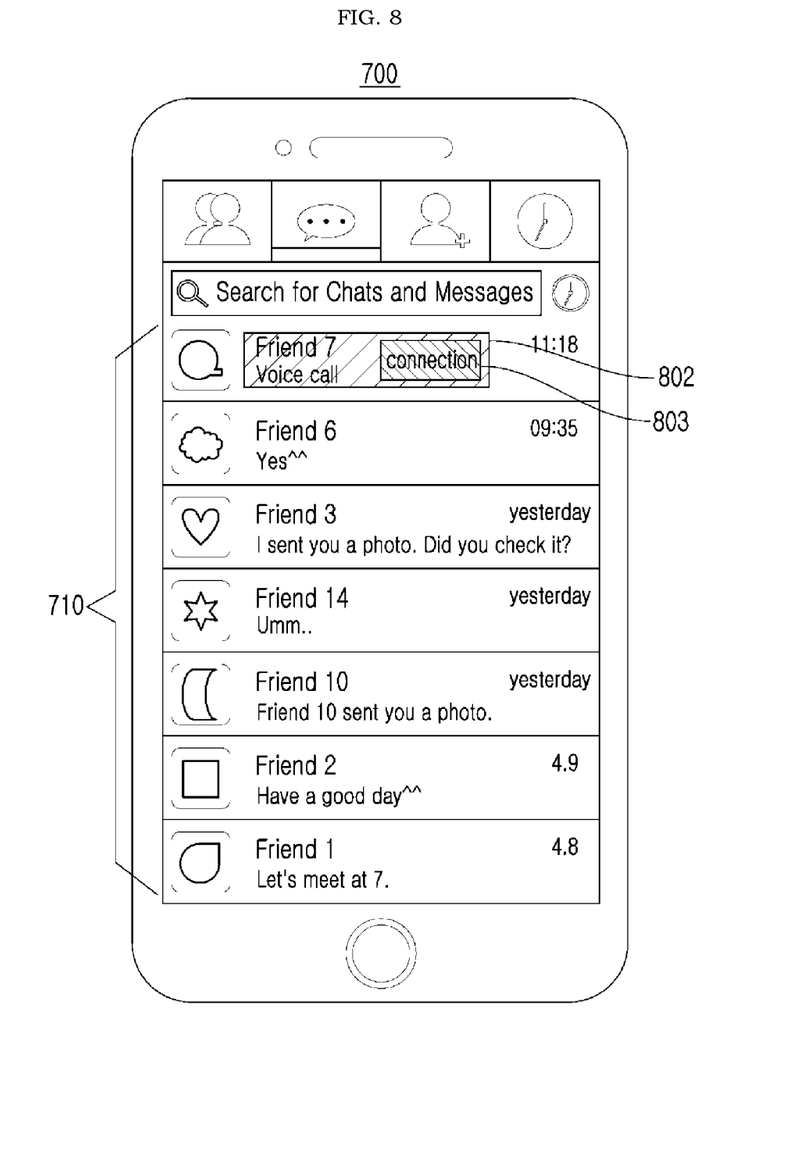
FIGS. 8 and 9 illustrate examples of a process of displaying a call connection state with an automatic connection target according to at least one example embodiment.
Figure 9:
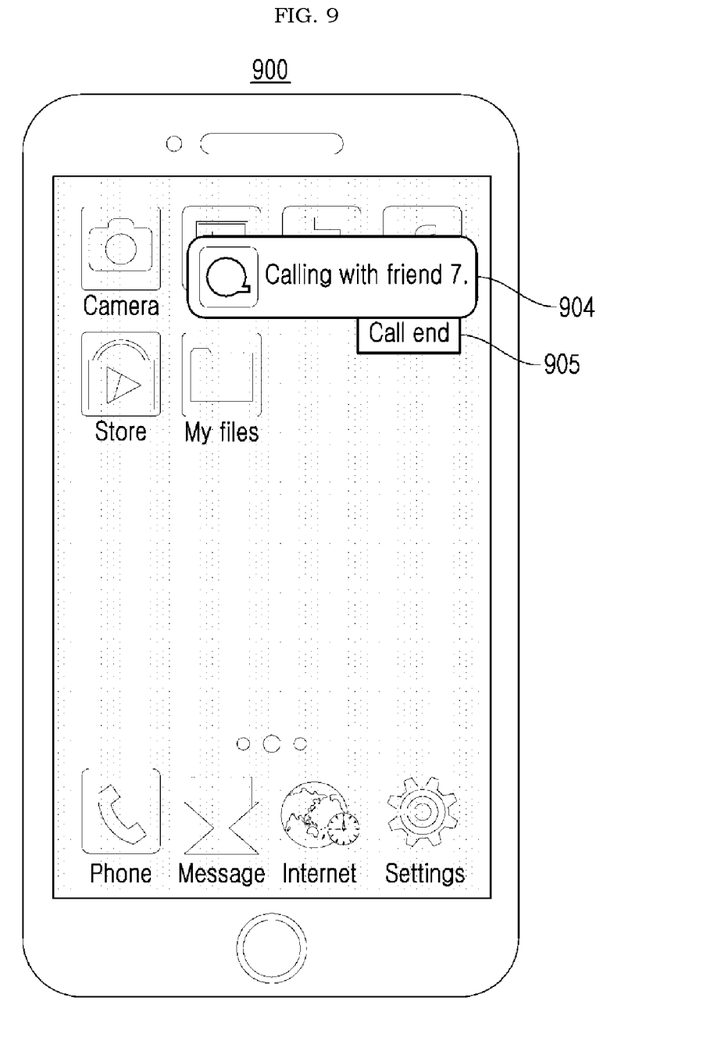

FIGS. 8 and 9 illustrate examples of a process of displaying a call connection state with an automatic connection target according to at least one example embodiment.

The state information provider 330 may display a call connection state with the automatic connection target on a user interface screen of a messenger. Referring to FIG. 8, the state information provider 330 may display a separate display element 802 on a friend item set as the automatic connection target on the conversation interface screen 700 including the list of friends 710 each having a call history with the user and may also display a call connection state 803 with a corresponding friend on the conversation interface screen 700. For example, in response to executing the messenger, a call with a friend set as the automatic connection target may be immediately and automatically connected. The state information provider 330 may display the call connection state 803 as "connected" if the call is connected, and otherwise, may display the call connection state 803 as "waiting".

In addition to the conversation interface screen 700, the state information provider 330 may display the call connection state 803 on any type of interface screens including friend information of the automatic connection target, such as the friend interface screen 500 of FIG. 6 and a conversation screen, a call screen, and an environment setting screen.

In particular, the state information provider 330 may display the call connection state 803 with the automatic connection target as a user interface displayed at all times in a floating state on the screen of the electronic device 110. That is, the state information provider 330 may overlay and thereby display an icon representing the call connection state 803 with the automatic connection target on any type of screens displayed on the display of the electronic device 110. For example, referring to FIG. 9, the state information provider 330 may display a floating icon 904 representing a call connection state with the automatic connection target on a wallpaper screen 900 displayed on the display of the electronic device 110.

Accordingly, the user may readily use other functions, such as search, web-surfing, messaging, and a document creation, on the electronic device 110 while a call with the automatic connection target is in connection. Also, while using the other function, the user may maintain the call with the automatic connection target and may verify the call connection state with the automatic connection state on any screen at all times.

In the case of configuring the floating icon 904 as a user interface of a shortcut function, if the user selects the floating icon 904 on any screen while using the other function, the user may immediately redirect to a call screen or a chat screen with the automatic connection target.

Also, a call end button 905 may be provided at a location adjacent to the floating icon 904. Accordingly, the user may forcefully terminate the call with the automatic connection target that is automatically connected in response to executing the messenger.

As described above, according to some example embodiments, since a call between two users may be automatically connected and maintained without performing a separate calling or acceptance process for the call between the two users by setting a specific user making a call with the user frequently or for a relatively long period of time, and by automatically connecting a call with the set specific user immediately in response to executing a program that includes a function of providing a VoIP service is executed, it is possible to provide a conversation environment in which the two users may feel as if they are close to each other at all times.

Also, according to some example embodiments, since audio, such as voice, or video may be exchanged at any time without performing a separate calling or acceptance operation by automatically connecting and maintaining a call during an execution of a program that includes a function of providing a VoIP service between designated users, it is possible to provide a convenient and continuous conversation environment between users that are calling for a relatively long period of time or frequently.

The systems and or apparatuses described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to some example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of automatically connecting a Voice over Internet Protocol (VoIP) call in an electronic device implemented by a computer, the method comprising:
setting a specific counterpart among counterparts capable of making the VoIP call over a network as an automatic connection target;
executing a program including a function of providing the VoIP call;
determining that a corresponding program is being executed on an electronic device of the automatic connection target;
automatically connecting the VoIP call with the automatic connection target in response to determining that the corresponding program is being executed on the electronic device of the automatic connection target without performing a calling operation and an acceptance operation for a call between a user of the electronic device and the automatic connection target;
providing state information associated with the automatic connection target through a screen display on the electronic device; and
maintaining the call between the user and the automatic connection target by automatically connecting the VoIP call without a separate calling operation while the program and the corresponding program are being executed,
wherein the providing comprises displaying a call connection state with the automatic connection target at all times during the maintaining of the call,
wherein the setting the specific counterpart among counterparts is independent from the providing the VoIP call, and
wherein the setting the specific counterpart comprises setting the automatic connection target based on a call history accumulated for each of the counterparts.

2. The method of claim 1, wherein the setting comprises setting the specific counterpart selected by the user from among the counterparts capable of making the VoIP call as the automatic connection target.

3. The method of claim 1, wherein the setting comprises:
recommending at least one counterpart among the counterparts capable of making the VoIP call based on the call history accumulated for each of the counterparts; and
setting the specific counterpart selected by the user from among the recommended at least one counterparts as the automatic connection target.

4. The method of claim 3, wherein the setting comprises updating the recommending at least one counterpart among the counterparts capable of making the VoIP call after a period of time based on the call history accumulated during the period of time.

5. The method of claim 1, wherein the connecting comprises immediately connecting the call between the user and the specific counterpart in response to executing the program on the electronic device of the specific counterpart and setting the user and the specific counterpart as mutual automatic connection targets.

6. The method of claim 1, wherein the providing comprises displaying information associated with the automatic connection target using a separate display element on a user interface screen of the program.

7. The method of claim 1, wherein the call connection state with the automatic connection target is provided on a user interface screen of the program.

8. The method of claim 1, wherein the call connection state with the automatic connection target is displayed in an icon in a floating state on a screen displayed on the electronic device.

9. The method of claim 8, wherein the icon indicating the call connection state with the automatic connection target includes a shortcut function of redirecting to a call screen or a chat screen with the automatic connection target.

10. A non-transitory computer-readable recording medium storing instructions that, when executed by a processor of an electronic device, cause the processor to implement a method of automatically connecting a Voice over Internet Protocol (VoIP) call in conjunction with a computer implemented by a computer, the method comprising:
setting a specific counterpart among counterparts capable of making the VoIP call over a network as an automatic connection target;
executing a program including a function of providing the VoIP call;
determining that a corresponding program is being executed on an electronic device of the automatic connection target;
automatically connecting the VoIP call with the automatic connection target in response to determining that the corresponding program is being executed on the electronic device of the automatic connection target without performing a calling operation and an acceptance operation for a call between a user of the electronic device and the automatic connection target;
providing state information associated with the automatic connection target through a screen display on the electronic device; and
maintaining the call between the user and the automatic connection target by automatically connecting the VoIP call without a separate calling operation while the program and the corresponding program are being executed,
wherein the providing comprises displaying a call connection state with the automatic connection target at all times during the maintaining of the call,
wherein the setting the specific counterpart among counterparts is independent from the providing the VoIP call, and
wherein the setting the specific counterpart comprises setting the automatic connection target based on a call history accumulated for each of the counterparts.

11. A system for automatically connecting a Voice over Internet Protocol (VoIP) call in an electronic device implemented by a computer, the system comprising:
one or more processors configured to execute computer-readable instructions,
wherein the one or more processors are:
configured to set a specific counterpart among counterparts capable of making the VoIP call over a network as an automatic connection target;
configured to execute a program including a function of providing the VoIP call;
configured to determine that a corresponding program is being executed on the an electronic device of the automatic connection target;
configured to automatically connect the VoIP call with the automatic connection target in response determining that the corresponding program is being executed on the electronic device of the automatic connection target without performing a calling operation and an acceptance operation for a call between a user of the electronic device and the automatic connection target;
configured to provide state information associated with the automatic connection target through a screen display on the electronic device; and
configured to maintain the call between the user and the automatic connection target by automatically connecting the VoIP call without a separate calling operation while the program and the corresponding program are being executed,
wherein the providing comprises displaying a call connection state with the automatic connection target at all times during the maintaining of the call,
wherein the setting of the specific counterpart among counterparts is independent from the providing the VoIP call, and
wherein the setting of the specific counterpart comprises setting the automatic connection target based on a call history accumulated for each of the counterparts.

12. The system of claim 11, including a target setter, wherein the target setter is configured to set the specific counterpart selected by the user from among the counterparts capable of making the VoIP call as the automatic connection target.

13. The system of claim 11, including a target setter, wherein the target setter is configured to set the automatic connection target based on the call history accumulated for each of the counterparts.

14. The system of claim 11, wherein the one or more processors are configured to recommend at least one counterpart among the counterparts capable of making the VoIP call based on the call history accumulated for each of the counterparts, and to set the specific counterpart selected by the user from among the recommended counterparts as the automatic connection target.

15. The system of claim 11, wherein the one or more processors are configured to immediately connect the VoIP call between the user and the specific counterpart in response to executing the program on the electronic device of the specific counterpart and setting the user and the specific counterpart as mutual automatic connection targets.

16. The system of claim 11, wherein the one or more processors are configured to display information associated with the automatic connection target using a separate display element on a user interface screen of the program.

17. The system of claim 11, wherein the one or more processors are configured to display the call connection state with the automatic connection target on a user interface screen of the program.

18. The system of claim 11, wherein the one or more processors are configured to display an icon indicating the call connection state with the automatic connection target in a floating state on a screen displayed on the electronic device.

* * * * *